United States Patent
Otobe

(10) Patent No.: US 9,915,554 B2
(45) Date of Patent: Mar. 13, 2018

(54) TERMINAL BLOCK STRUCTURE AND STATOR FOR RESOLVER

(71) Applicant: MINEBEA CO., LTD., Kitasaku-gun, Nagano (JP)

(72) Inventor: Haruki Otobe, Fukuroi (JP)

(73) Assignee: MINEBEA CO., LTD., Nagano (JP)

(*) Notice: Subject to any disclaimer, the term of this patent is extended or adjusted under 35 U.S.C. 154(b) by 277 days.

(21) Appl. No.: 14/730,646

(22) Filed: Jun. 4, 2015

(65) Prior Publication Data

US 2015/0377652 A1 Dec. 31, 2015

(30) Foreign Application Priority Data

Jun. 27, 2014 (JP) ................................ 2014-132676

(51) Int. Cl.
*G01D 5/20* (2006.01)

(52) U.S. Cl.
CPC ...................... *G01D 5/20* (2013.01)

(58) Field of Classification Search
CPC .......... G01D 5/145; G01D 5/142; G01D 5/20; G01D 18/00; G01D 18/004; G01D 5/12; G01D 5/14; G01D 5/2006; G01D 5/2013; G01D 5/202; G01D 5/204; G01D 5/2053; G01D 5/2073
USPC ........ 324/765.01, 177, 143, 545, 137, 154 R
See application file for complete search history.

(56) References Cited

U.S. PATENT DOCUMENTS

| | | | | |
|---|---|---|---|---|
| 6,208,060 B1 * | 3/2001 | Kusase | .................. | H02K 1/165 310/201 |
| 6,343,259 B1 * | 1/2002 | Sedlak | .................. | G01N 25/72 324/538 |
| 6,541,957 B1 * | 4/2003 | Zick | ...................... | G01M 13/00 324/166 |
| 7,527,530 B2 * | 5/2009 | Olejniczak | ............. | H01R 13/42 324/538 |
| 7,893,578 B2 * | 2/2011 | Hayashi | ................. | H02K 3/522 310/156.05 |

(Continued)

FOREIGN PATENT DOCUMENTS

| | | | | |
|---|---|---|---|---|
| JP | H09-74025 A | | 3/1997 | |
| JP | 2000175396 A | * | 6/2000 | ............. H02K 11/40 |

(Continued)

OTHER PUBLICATIONS

Apr. 24, 2017 Office Action issued in Japanese Patent Application No. 2014-132676.

*Primary Examiner* — Taqi Nasir

(74) *Attorney, Agent, or Firm* — Oliff PLC

(57) ABSTRACT

The width of a terminal block is decreased by decreasing a space between an external connecting terminal at each end of the external connecting terminals and an end portion of the terminal block, whereas a space between a winding terminal at each end of the winding terminals of terminals and an end portion of the terminal block is sufficiently obtained. A terminal 7 is provided with an external connecting terminal 71 and a winding terminal 72, and the terminal 7 has a shape such that a center line Lp in the width direction of the winding terminal 72 is shifted from a center line Le in the width direction of the external connecting terminal 71. A plurality of the terminals 7 are arranged on a terminal block 11 so that pitches between the winding terminals 72 are unequal.

9 Claims, 5 Drawing Sheets

(56) References Cited

U.S. PATENT DOCUMENTS

| | | | | |
|---|---|---|---|---|
| 2004/0119350 A1* | 6/2004 | Miya | ................ | H02K 3/522 |
| | | | | 310/71 |
| 2008/0001610 A1* | 1/2008 | Bae | ................ | G01N 27/223 |
| | | | | 324/664 |
| 2012/0126645 A1* | 5/2012 | Gruetzmacher | ........ | H02K 5/225 |
| | | | | 310/71 |

FOREIGN PATENT DOCUMENTS

| JP | 2010-175349 A | | 8/2010 | | |
|---|---|---|---|---|---|
| JP | 2010175349 A | * | 8/2010 | ............. | G01D 5/245 |
| JP | 2010175396 A | * | 8/2010 | ............. | G01D 5/245 |
| JP | 2013-132113 A | | 7/2013 | | |

* cited by examiner

TERMINAL BLOCK STRUCTURE AND STATOR FOR RESOLVER

BACKGROUND OF THE INVENTION

Field of the Invention

The present invention relates to a terminal block structure for a resolver having a terminal block with plural terminals and relates to a resolver stator provided with the terminal block structure.

Description of Related Art

For example, resolvers are used as sensors for detecting rotation angle of motors mounted in electric vehicles, hybrid vehicles, or the like. Such types of resolvers are generally provided with a rotor, a stator, a pair of insulators, and coils. The rotor is secured to a rotating shaft of a motor so as to able to rotate. The stator is fixed to a housing and is arranged outside the rotor. The insulators are attached so as to hold the stator from both sides in the axial direction. The coils include an exciting coil and a detecting coil and are wound around magnetic insulating portions of the insulators. When the rotor rotates, the dimension of air gap formed between the rotor and the stator is changed, and the voltage according to this change is induced by the detecting coil of the stator, whereby a detection output is generated. The detection output is a signal corresponding to a rotation angle of the rotor, whereby a rotation angle of the motor can be detected.

One of the insulators constructing the resolver is integrally formed with a terminal block that is used as a relay portion for inputting and outputting signals with respect to the outside. The terminal block includes plural long thin terminals that are arranged in parallel at a predetermined spacing. Each of the terminals is stood on the terminal block in parallel to the axial direction of the resolver and is aligned in parallel to the tangential direction of the circumferential direction of the resolver. The terminal is formed by integrally forming a winding terminal at an end of an external connecting terminal to be connected with a lead wire, and the winding terminal is thinner than the external connecting terminal and is used by winding a coil. For example, a terminal with the following shape is known (Japanese Unexamined Patent Application Laid-Open No. 2010-175349, FIG. 2). In this case, both the winding terminal and the external connecting terminal have a long thin plate shape, the winding terminal is formed with a narrower width than that of the external connecting terminal, and the center lines in the width directions thereof coincide with each other, whereby the terminal has a symmetric shape.

In the above terminal block structure for a resolver having a terminal block with plural fixed terminals, a pitch between the adjacent terminals is selected according to a pitch between the external connecting terminals. Therefore, according to the terminal shape disclosed in Japanese Unexamined Patent Application Laid-Open No. 2010-175349, since decreasing the pitch of the external connecting terminals fixed on the terminal block is limited, there may be cases in which the pitch of the winding terminals cannot be appropriately decreased. Accordingly, the width of the terminal block cannot be decreased by decreasing a space between an external connecting terminal at each end of the external connecting terminals and an end portion of the terminal block while a space between a winding terminal at each end of the winding terminals and an end portion of the terminal block is sufficiently obtained.

SUMMARY OF THE INVENTION

The present invention has been completed in view of these circumstances, and it is an object of the present invention to provide a terminal block structure for decreasing the width of a terminal block and a resolver stator provided therewith. According to the terminal block structure, a space between an external connecting terminal at each end of external connecting terminals and an end portion of the terminal block is decreased while a space between a winding terminal at each end of winding terminals and an end portion of the terminal block is sufficiently obtained.

According to a first aspect of the present invention, the present invention provides a terminal block structure for a resolver having a terminal block on which a plurality of terminals are arranged in parallel at predetermined spacing. Each of the terminals includes an external connecting terminal and a winding terminal. The winding terminal has a center line in the width direction thereof, which is shifted from a center line in the width direction of the external connecting terminal. The terminals are arranged on the terminal block so that the winding terminals are aligned at an unequal pitch.

According to the terminal block structure of the present invention, in the winding terminal and the external connecting terminal of the terminal, the center line in the width direction of the winding terminal is shifted from the center line in the width direction of the external connecting terminal. That is, the terminal has a shape such that the center line in the width direction of the winding terminal does not coincide with the center line in the width direction of the external connecting terminal. For example, when plural terminals are arranged in parallel at positions symmetric about the center of the terminal block, the winding terminals are aligned toward the center of the terminal block at an equal pitch (a First pitch), and a pitch between the winding terminals at each side of the center of the terminal block is made to differ from the First pitch. In this case, the total of the pitches is decreased by arranging each of the winding terminals toward the center of the terminal block, and sufficient length of pitches of the external connecting terminals is obtained. Accordingly, the width of the terminal block is decreased by decreasing a space between the external connecting terminal at each end of the external connecting terminals and an end portion of the terminal block while a space between the winding terminal at each end of the winding terminals of the terminals and an end portion of the terminal block is sufficiently obtained.

According to a second aspect of the present invention, the plurality of the terminals may include the external connecting terminals that are arranged on the terminal block at an equal pitch.

According to a third aspect of the present invention, the plurality of terminals may be formed in one or two types of shape. According to the third aspect of the present invention, although the terminals have a shape such that the center line in the width direction of the winding terminal is shifted from that of the external connecting terminal, the terminals can be formed in only one or two types of shape, whereby increase in the production cost is avoided.

According to a fourth aspect of the present invention, the present invention provides a resolver stator including a stator core, a first insulator, a second insulator, coils, and the terminal block structure according to the first aspect of the present invention. The stator core has an approximately circular shape and includes a plurality of fixed magnetic poles arranged in the circumferential direction. The first insulator and the second insulator have magnetic insulating portions and are attached so as to hold the stator core from both sides in the axial direction. The coils include an exciting coil and a detecting coil and are wound around the magnetic insulating portions.

According to the present invention, a terminal block structure for decreasing the width of a terminal block, and a resolver stator having the terminal block structure, are provided. According to the terminal block structure, a space between the external connecting terminal at each end of the external connecting terminals and an end portion of the terminal block is decreased while a space between the winding terminal at each end of the winding terminals of the terminals and an end portion of the terminal block is sufficiently obtained.

PREFERRED EMBODIMENTS OF THE INVENTION

An embodiment of the present invention will be described with reference to figures hereinafter.

(1) First Embodiment (1-1) Structure of First Embodiment

Figure 1:
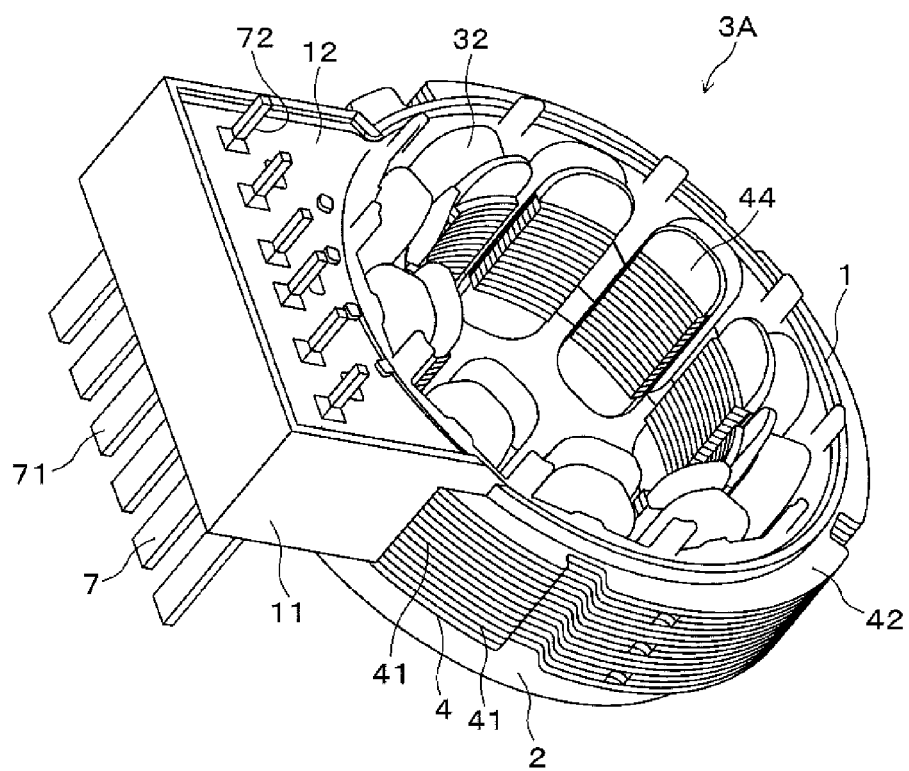
FIG. 1 is a perspective view showing a resolver stator according to an embodiment of the present invention.
Figure 2:
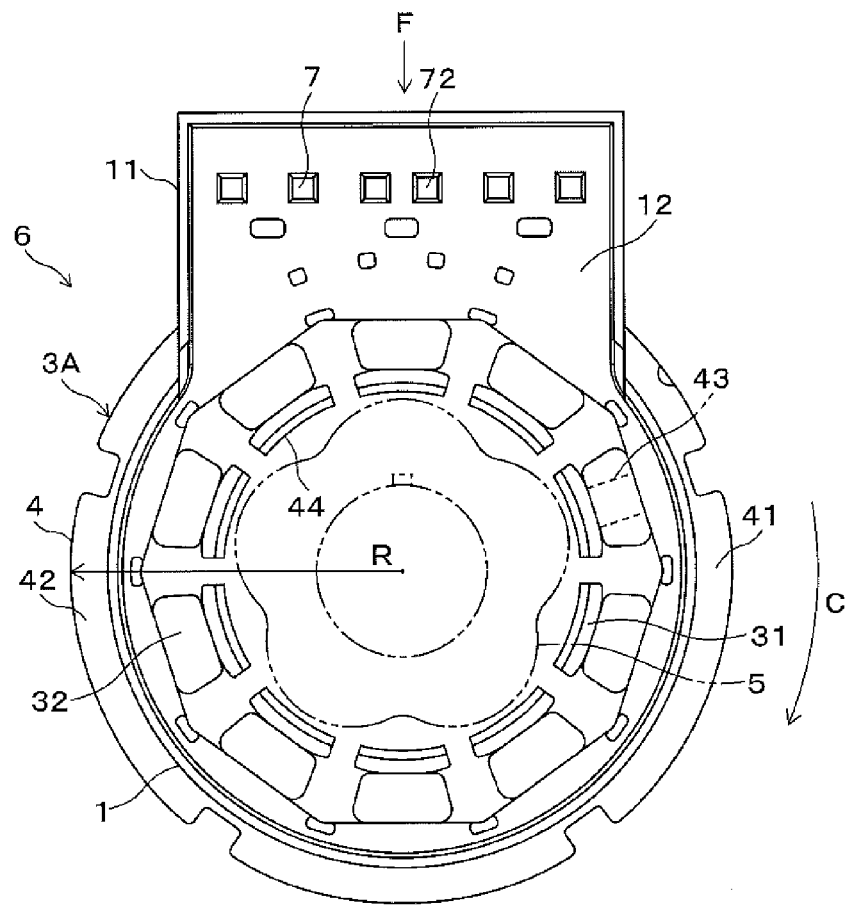
FIG. 2 is a top view of a stator of an embodiment.
Figure 3:
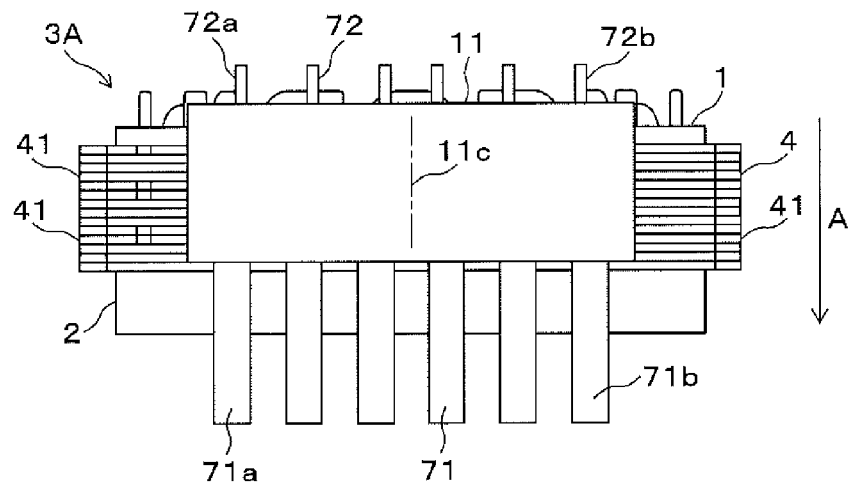
FIG. 3 is a side view of a stator of an embodiment, which is viewed from a terminal block side.

FIGS. 1 to 3 show a stator 3A of a resolver 6 of an embodiment. The stator 3A includes a circular stator core 4 and includes a first insulator 1 and a second insulator 2, which are attached so as to hold the stator core 4 from both sides in the axial direction. As shown in FIG. 2, the resolver 6 is constructed by providing a rotor 5 inside the stator 3A. The rotor 5 has a shaft center at which an output shaft of a motor (not shown in the figures) is fixed, and the resolver 6 is used as a sensor for detecting a rotation angle of the motor. In the following descriptions, the "circumferential direction" and the "radial direction" are defined as the directions indicated by the symbols "C" and "R" in FIG. 2, respectively, regarding the circular stator 3A. In addition, the "axial direction" is defined as the direction indicated by the symbol "A" in FIG. 3 regarding the circular stator 3A.

The stator core 4 is formed by laminating plural circular electromagnetic steel sheets 41, which are produced by press forming so as to have a predetermined shape, and is formed mainly of yoke portion 42. The yoke portion 42 has plural fixed magnetic poles 43 (shown in FIG. 2) that inwardly project in the radial direction and that are formed at an inner circumferential portion thereof at an equal spacing in the circumferential direction. The fixed magnetic poles 43 have a top formed with a pole tooth portion 44.

The first insulator 1 and the second insulator 2 are produced by injection molding an insulating resin. The first insulator 1 is attached to one end side in the axial direction (upper side in FIG. 3), and the second insulator 2 is attached to the other end side (lower side in FIG. 3). Each of the first insulator 1 and the second insulator 2 has magnetic insulating portions 31 that are formed at an inner circumferential portion thereof and that cover each of the fixed magnetic poles 43. Each of the fixed magnetic poles 43 is wound with coils 32 via the magnetic insulating portion 31. The coils 32 include an exciting coil (not shown in the figures) and a detecting coil (also not shown in the figures).

The first insulator 1 has a terminal block 11 that is integrally formed at a portion of an outer circumferential portion thereof and that outwardly protrudes in the radial direction. The terminal block 11 is formed into a rectangular parallelepiped shape that approximately covers the outer circumferential surface in the axial direction of the stator core 4 at a portion at which the terminal block 11 is arranged. The terminal block 11 has a flat surface 12 that is formed orthogonally to the axial direction at an upper side thereof (the side attached with the first insulator 1). Terminals 7 are insert molded in the terminal block 11.

Figure 4:
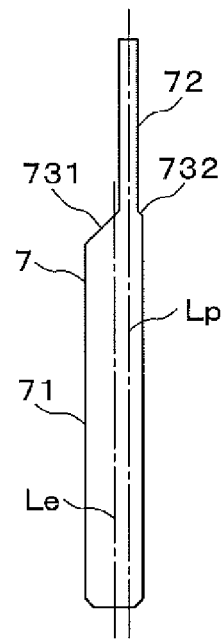
FIG. 4 is a front view of a terminal of an embodiment.

The terminals 7 are formed into a long and thin flat sheet shape as shown in FIG. 4 by, for example, punching, and has an external connecting terminal 71 and a winding terminal 72. Side surface portions transiting from the external connecting terminal 71 to the winding terminal 72 at both sides of the terminal 7 are formed with smoothly transiting slant surfaces 731 and 732, respectively.

The terminals 7 are arranged so that the external connecting terminal 71 downwardly projects from the terminal block 11 and that the winding terminal 72 upwardly projects from the terminal block 11. The winding terminals 72 are wound with the coils 32, and each of the coils 32 is applied with an exciting signal from the outside via one of the external connecting terminals 71 and outputs a detection signal to the outside via one of the external connecting terminals 71.

The winding terminal 72 is shifted to one side with respect to the external connecting terminal 71. That is, the terminal 7 has an asymmetric shape, and a center line Lp in the width direction of the winding terminal 72 is shifted from a center line Le in the width direction of the external connecting terminal 71. The degree of the shift may be freely selected based on the design requirements. In the case described by the figures, the side surface in the shifted direction side of the winding terminal 72 does not coincide with the side surface of the external connecting terminal 71 because the slant surface 732 is formed. However, the side surface in the shifted direction side of the winding terminal 72 may be made to coincide with the side surface of the external connecting terminal 71 by not forming the slant surface 732.

Figure 5:
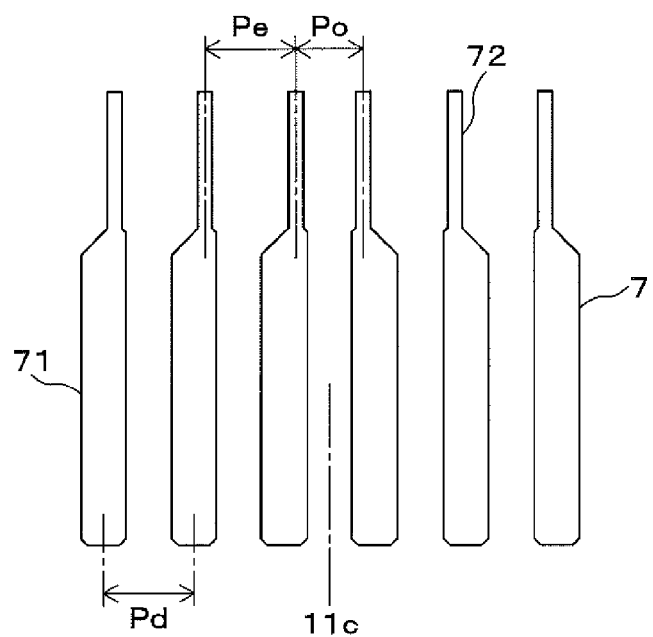
FIG. 5 is a front view showing a condition of terminals aligned on a terminal block.

FIG. 5 shows only six terminals 7 in a condition in which they are arranged on the terminal block 11. The six terminals 7 have the same shape of one kind and are aligned so that the width directions thereof coincide with each other within the same plane. As shown in FIG. 5, the six terminals 7 are symmetric about a center 11c in the width direction of the terminal block 11, and three terminals 7 at the left side and three terminals 7 at the right side are aligned in parallel so that the winding terminals 72 are shifted to the center 11c of the terminal block 11 respectively. That is, the three terminals 7 at the right side are positioned where the three terminals 7 at the left side are reversed by 180 degrees around the longitudinal axis.

As shown in FIG. 5, adjacent pitches Pd of the external connecting terminals 71 are the same. On the other hand, three winding terminals 72 at the left side and three winding terminals 72 at the right side have the same pitch Pe, but a pitch Po between the winding terminals 72 at both sides of the center 11c of the terminal block 11 is smaller than the pitch Pe. That is, the pitches between the winding terminals 72 are not the same and are not equal to each other (Pe and Po).

(1-2) Effects of First Embodiment

According to the terminal block structure included in the stator core 4 of the First Embodiment, each of the three terminals 7 at the right and the left are arranged as follows. The winding terminals 72 are aligned toward the center 11c of the terminal block 11 at an equal pitch (pitch Pe), and the winding terminals 72 at both sides of the center 11c of the terminal block 11 is set to have the pitch Po that is less than the pitch Pe. Therefore, each of the winding terminals 72 is placed near the center 11c of the terminal block 11, thereby decreasing the total of the pitches, and sufficient length of the pitch Pd of the external connecting terminal 71 is obtained. Accordingly, the width of the terminal block 11 is decreased by decreasing a space between the external connecting terminal 71 at each end side of the external connecting terminals 71 (71a and 71b in FIG. 3) and an each end portion of the terminal block 11 while a space between the winding terminal 72 at each end side of the winding terminals 72 (72a and 72b in FIG. 3) of the terminals 7 and an each end portion of the terminal block 11 is sufficiently obtained.

Moreover, the terminals 7 have a plate shape. Therefore, although the terminals 7 have a shape such that the center line Lp in the width direction of the winding terminal 72 is shifted from the center line Le in the width direction of the external connecting terminal 71, the terminal block structure is constructed by preparing plural (in this case, six) terminals with the shape of one kind even when each of the three terminals is symmetrically aligned. Accordingly, increase in the production cost is avoided. The First Embodiment is described by using six terminals 7, but for example, the number of the terminals 7 may be four, and each of the two terminals 7 may be symmetrically aligned.

(2) Another Embodiment (2-1) Structure of Another Embodiment

Next, another embodiment including terminals with different shape from that of the terminals in the First Embodiment will be described. Since only the terminals are different from those in the First Embodiment, the same structural components as those in the First Embodiment are indicated in the figures by the same symbols as those in the First Embodiment, and descriptions for these structural components will be omitted.

Figure 6:
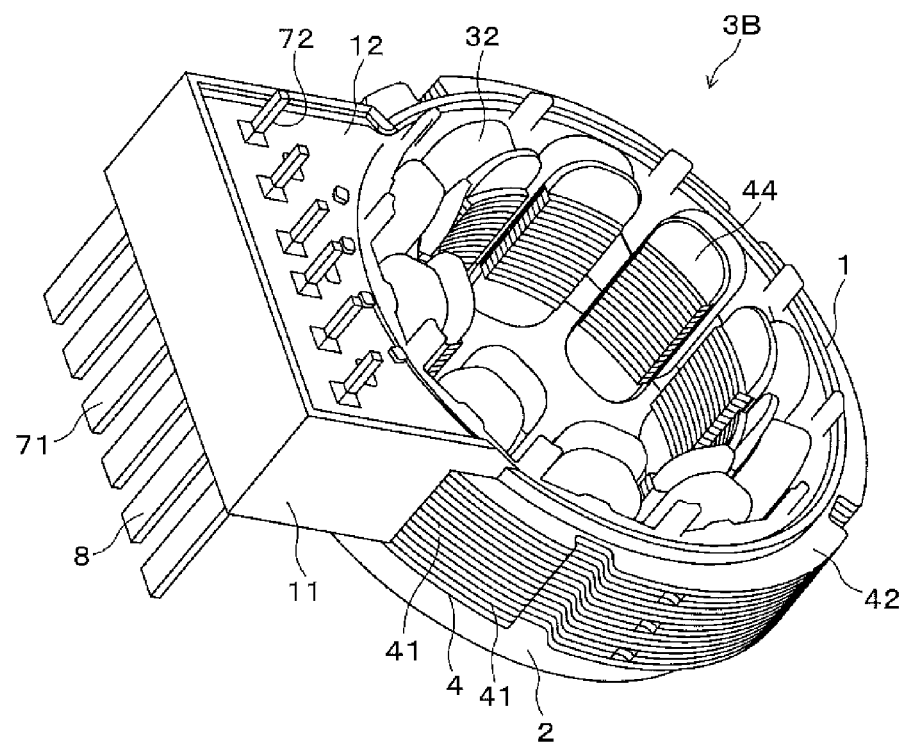
FIG. 6 is a perspective view showing a resolver stator according to another embodiment of the present invention.
Figure 7:
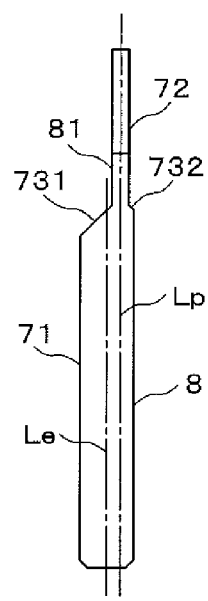
FIG. 7 is a front view of a terminal of another embodiment.

FIG. 6 shows a stator 3B in which terminals 8 of another embodiment are fixed on the terminal block 11. The terminals 8 have an approximately the same general front view shape (shape viewed from the direction of arrow F in FIG. 2) as that of the terminals 7. As shown in FIG. 7, the center line Lp in the width direction of the winding terminal 72 is shifted from the center line Le in the width direction of the external connecting terminal 71 in the terminal 8.

Figure 8:
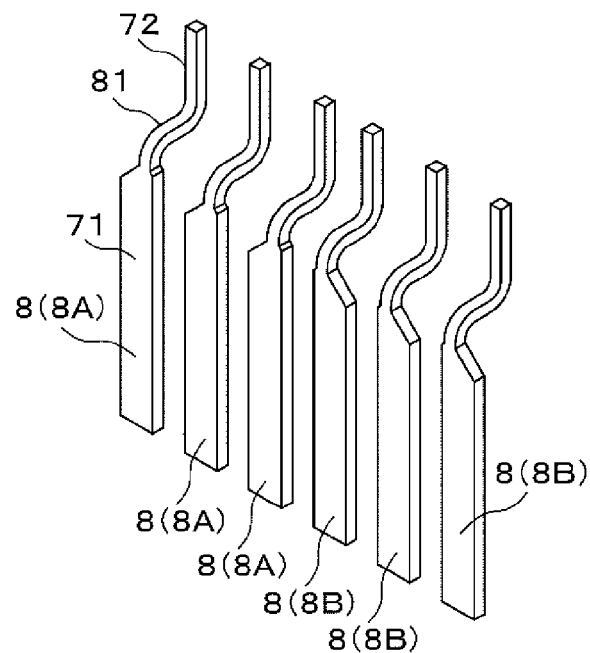
FIG. 8 is a perspective view showing a condition of terminals aligned on a terminal block in another embodiment.

As shown in FIG. 8, in the terminals 8 in this embodiment, a root portion of the winding terminal 72 is bent in a crank shape in a direction orthogonal to the surface of the external connecting terminal 71 (depth direction of the terminal block 11 as shown by the arrow F in FIG. 2). An upper end portion of the winding terminal 72 upwardly extends parallel to the external connecting terminal 71 via the bent portion 81.

Figure 9:
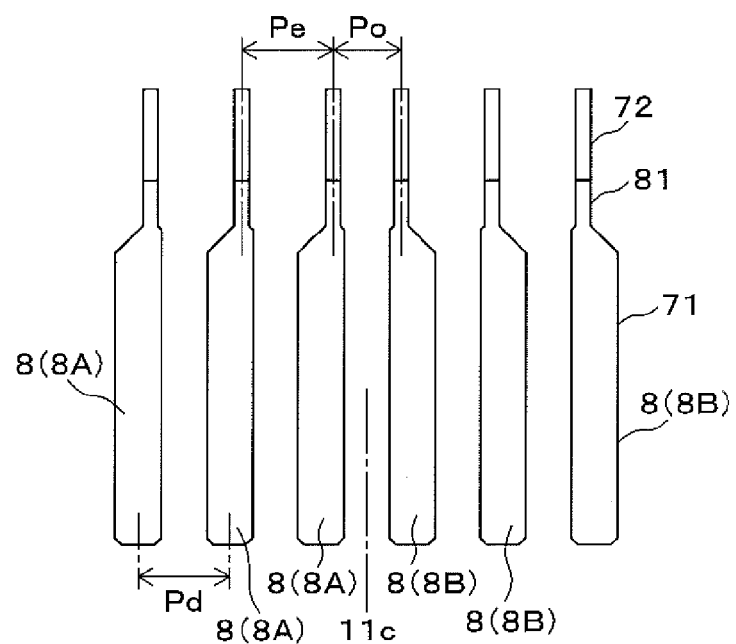
FIG. 9 is a front view showing a condition of terminals aligned on a terminal block in another embodiment.

As shown in FIGS. 8 and 9, each of the terminals 8 has a symmetric shape about the center 11c of the terminal block 11. That is, in FIGS. 8 and 9, two types of shape, the shape of the terminals 8A at the left side and the shape of the terminals 8B at the right side, are used. Each of the terminals 8 (8A and 8B) differ only in that the front view shape is symmetric and have the same side view shape and the same length in the depth direction.

(2-2) Effects of Another Embodiment

As shown in FIG. 9, three terminals 8A and three terminals 8B at the right and left side fixed on the terminal block 11 in this embodiment are arranged in the same manner as in the First Embodiment. That is, the winding terminals 72 are aligned toward the center 11c of the terminal block 11 at an equal pitch (Pe), and the winding terminals 72 at both sides of the center 11c of the terminal block 11 are set to have a pitch Po that is less than the pitch Pe between the winding terminals 72 at each of the right and the left. Therefore, each of the winding terminals 72 is placed near the center 11c of the terminal block 11, thereby decreasing the total of the pitches, and sufficient length of the pitch Pd of the external connecting terminal 71 is obtained. As a result, the width of the terminal block 11 is decreased by decreasing a space between the external connecting terminal 71 at each end of the external connecting terminals 71 (corresponding to 71a and 71b in FIG. 3) and an each end portion of the terminal block 11 while a space between the winding terminal 72 at each end of the winding terminals 72 (corresponding to 72a and 72b in FIG. 3) of the terminals 8 and an each end portion of the terminal block 11 is sufficiently obtained.

Moreover, although the terminals 8 have bent portions 81, it is enough to prepare only the terminals 8A and 8B with shape of two types so as to symmetrically arrange the terminals 8 on the terminal block 11, whereby increase in the production cost is avoided.

The embodiment of the present invention is not limited to each of the above embodiments and may include various modifications that can be anticipated by one skilled in the art. The effects of the present invention are also not limited to the descriptions above. That is, various additions, changes, and partial omissions can be performed in a range that does not exceed the general concept and object of the present invention, which are derived from the descriptions recited in the Claims and equivalents thereof.

What is claimed is:

1. A terminal block structure for a resolver comprising:
   a terminal block; and
   a plurality of terminals arranged in a width direction at predetermined spacing at the terminal block, wherein each of the plurality of terminals includes an external connecting terminal and a winding terminal;
   the winding terminal is shifted in a width direction with respect to the external connecting terminal; and each of a pair of the winding terminals is located on both sides of a center of the terminal block in the width direction, and is aligned to the center of the terminal block.

2. The terminal block structure for the resolver according to claim 1, wherein the plurality of terminals include the external connecting terminals arranged at the terminal block at an equal pitch.

3. The terminal block structure for the resolver according to claim 1, wherein the plurality of terminals are formed in one or two types of shape.

4. A resolver stator comprising:
a stator core having an approximately circular shape and including a plurality of fixed magnetic poles arranged in a circumferential direction;
a first insulator and a second insulator having magnetic insulating portions and being attached to hold the stator core from both sides in an axial direction;
a plurality of coils, including an exciting coil and a detecting coil, being wound around the magnetic insulating portions; and
the terminal block structure recited in claim 1.

5. A resolver comprising:
a rotor; and
a stator including:
a stator core having an approximately circular shape and including a plurality of fixed magnetic poles arranged in a circumferential direction;
a first insulator and a second insulator having magnetic insulating portions and being attached to hold the stator core from both sides in an axial direction;
a plurality of coils, including an exciting coil and a detecting coil, being wound around the magnetic insulating portions; and
the terminal block structure recited in claim 1.

6. A sensor for detecting a rotation angle of a motor, the sensor comprising:
a member formed with an insulating resin;
a terminal block formed at the member; and
a plurality of terminals arranged in a width direction at predetermined spacing at the terminal bock, wherein
each of the plurality of terminals includes a terminal having a flat-sheet shape and a terminal having a long shape;
the terminal having the long shape is shifted in the width direction with respect to the terminal having the flat-sheet shape; and
the terminals having the long shape are located on both sides in the width direction and are shifted to a center of the terminal block with respect to the terminals having the flat-sheet shape on both sides in the width direction.

7. The sensor for detecting a rotation angle of the motor according to claim 6, wherein the terminals having the flat sheet shape are arranged at the terminal block at an equal pitch in the width direction.

8. The sensor for detecting a rotation angle of the motor according to claim 6, wherein the plurality of terminals are formed in one or two types of shape.

9. The sensor for detecting a rotation angle of the motor according to claim 6, wherein the terminals having the long shape have a root portion bent in a crank shape.

* * * * *